3,367,927
POLYMERIZATION PROCESS
Abner B. Stryker, Jr., Paramonga, Peru, and Philip Messina, Hanover, Md., assignors, by mesne assignments, to W. R. Grace & Co., New York, N.Y., a corporation of Connecticut
No Drawing. Continuation of application Ser. No. 282,868, May 24, 1963. This application Sept. 14, 1965, Ser. No. 487,308
5 Claims. (Cl. 260—93.7)

This invention relates to the production of polypropylene. This invention is particularly directed to a process for producing polypropylene in liquid propylene wherein the rate of polymerization is increased.

This is a continuation of application Serial Number 282,868, filed May 24, 1963, now abandoned.

In the process of this invention, propylene is polymerized in liquid propylene as diluent and in the presence of a titanium trichloride-aluminum trichloride complex and dialkyl aluminum halide cocatalyst system. From 0.001 to 0.5 mole percent, based on the liquid propylene, of hydrogen is then added to the polymerization system to increase the rate of polymerization. It has been found that the addition of hydrogen to the diluent free propylene polymerization process wherein the titanium trichloride-aluminum trichloride complex and a dialkyl aluminum halide cocatalyst system is used, will increase the rate of polymerization by a factor of approximately two times.

Numerous processes for the polymerization of propylene are known by the prior art (Belgian Patent 538,792 and U.S. Patents 2,949,447 and 2,911,384). By the processes described in these patents, propylene is generally contacted under relatively mild conditions of pressure and temperature with a catalyst composition composed of an organometallic compound of a metal of Groups II and III of the Mendeleef Periodic Table, such as aluminum, with a halide of a metal of Groups IVa, Va or VIa, such as titanium trihalide to produce high molecular weight solid crystalline polypropylene. Such catalysts are known in the art as Ziegler-Natta catalysts. The polymerization is usually carried out in an inert hydrocarbon solvent, but may be conducted in a diluent free process, i.e., one wherein the liquid monomer is its own diluent.

Generally, the polypropylene produced by such processes has a molecular weight of from about 50,000 to about 5,000,000 with a major portion of the polymer being crystalline in that it exhibits a crystalline structure by X-ray analysis and is insoluble in heptane. Crystalline polypropylene is well known for its highly desirable properties such as high tensile strength, high modulus of elasticity and good resistance to elevated temperatures.

The catalyst compositions used by the prior art processes were usually comprised of titanium trichloride, either alone or cocrystallized with aluminum chloride, and an organometallic component such as an aluminum alkyl, as an activator. Such catalyst compositions do not exhibit as high an activity in the polymerization of propylene as is generally desired, for the solid polymer which is produced will form on the solid catalyst particles during the polymerization. The polymer which is formed on the catalyst particles will eventually completely coat the particles so that the polymerization reaction will cease after a relatively short period of time. To compensate for the low rate of polymerization which would normally result, the amount of catalyst must be substantially increased to produce a sufficient yield of polymer. When the proportion of catalyst is increased, however, the resultant polymer will be found to contain traces of the residual catalyst components. For commercial practice, it is essential that the finished polymer be substantially free of catalyst and other contaminants, since these contaminants will discolor and weaken the polymer. To purify the polymer, it is necessary to subject the polymer to a purification process which involves the extraction of the polymer in an organic solvent solution as an alcohol or an alcohol-hydrocarbon mixture.

It is thus apparent that a high rate of polymerization, i.e., high catalytic activity, is essential for commercial production. For commercial practice, the yield of polymer per part of catalyst must be as high as possible for the purpose of saving on catalyst cost and also to obtain the highest weight yield of polymer possible for the smallest amount of catalyst. The polypropylene must not only be formed in good yield, however, but must be highly crystalline in nature in order to develop the optimum properties of the polymer such as density, melting point, tensile strength, and stiffness.

In the diluent free propylene polymerization process wherein liquid propylene is used as the diluent, it is especially desirable to have a high rate of polymerization in order to obtain a high percentage of conversion of monomer to polymer, thereby conserving the propylene and lowering the cost of production.

It is an object of this invention, therefore, to provide an improved process by which polypropylene can be obtained in a diluent free process at a minimum cost and with a maximum of catalyst activity. Accordingly, it is an object of this invention to polymerize propylene in liquid propylene at an increased rate of polymerization whereby the above mentioned problems of the prior art are avoided. Other objects, advantages, and features of this invention will be apparent to those skilled in the art in view of the following more detailed description of the invention.

These and other objects are obtained by means of the process of this invention wherein propylene is polymerized in liquid propylene in the presence of a polymerization catalyst comprising a titanium trichloride-aluminum trichloride complex and a dialkyl aluminum halide. A quantity of hydrogen in the range of from 0.001 to 0.5 mole percent, based on the liquid propylene, is added to the above polymerization system. It has been found that such process increases the rate of polymerization by a factor of approximately two times. The improved results of this invention will be demonstrated more clearly by the working examples which follow.

The results of this invention are very significant when examined in light of the existing knowledge on the polymerization of propylene. According to the published data of Natta (la Chimica E.L: I Industria, 41,519 (1959)), the addition of hydrogen to a propylene polymerization system using a Ziegler-Natta catalyst, such as a titanium trichloride, triethyl aluminum cocatalyst system, in the absence of a solvent decreased the catalyst activity. In addition, British Patent 908,101 reports that the usage of hydrogen in a propylene polymerization system using a solvent and the titanium trichloride-aluminum trichloride and diethyl aluminum chloride cocatalyst system decreases the catalytic activity. This result is substantiated by the data shown in Examples XI and XII. The improved results of the process of this invention are, therefore, completely unexpected and very surprising.

The improved results of this invention occur only when propylene is polymerized in a diluent free process in the presence of hydrogen and a $TiCl_3:AlCl_3$ complex and dialkyl aluminum halide cocatalyst. As will be seen from the working examples, the usage of either a solvent or an organometallic component other than a dialkyl aluminum halide prevents the obtainment of an increased rate of polymerization.

The titanium trichloride-aluminum trichloride complex is a well-known commercial product (U.S. Patent 3,032,-510). It is made by reacting TiCl$_4$ with aluminum metal at high temperatures, whereby by-product AlCl$_3$ is formed, the AlCl$_3$ remaining intimately dispersed throughout the TiCl$_3$, the TiCl$_3$:AlCl$_3$ mole ratio being about 3:1. This material is then activated by grinding in a ball mill or the like, preferably for several days.

Numerous dialkyl aluminum halides have been found suitable for usage for this invention. Examples of such are diethyl aluminum chloride, diethyl aluminum fluoride, diethyl aluminum iodide, di-normal propyl aluminum chloride, etc. The preferred alkyl is diethyl aluminum chloride.

The pressure and temperature used in the polymerization process of this invention are not critical. Generally, it has been found that pressures ranging from atmospheric up to about 1,000 p.s.i.g. are satisfactory, pressures of 130 to 650 p.s.i.g. being preferred. Similarly, temperatures ranging from 20 to 170° C. or even higher are acceptable. For practical purposes, a polymerization reaction temperature in the range of 60 to 90° C. is employed.

In practicing this invention, the amount of catalyst is not critical, but should be kept to a minimum to save on catalyst cost. For example, relatively small amounts are operable to form relatively large amounts of polypropylene. Catalyst to monomer weight ratios in the range of from 1:1000 are acceptable.

The function of the hydrogen as used in this invention must be distinguished from that set forth in U.S. Patent 3,051,690. According to that patent, the molecular weight of an olefin polymer is controlled by adding gaseous hydrogen to the polymerization process. When used in this invention, the hydrogen will also control the molecular weight of the polypropylene. However, the intended function of the hydrogen, when used in appropriate amounts, is to increase the rate of polymerization which is contrary to the teachings of the aforesaid patent. This difference in result is due to our use of TiCl$_3$:AlCl$_3$ complex in combination with a dialkyl aluminum halide cocatalyst, which catalyst system is not disclosed in said patent. The amount of hydrogen which may be used has been found to be from 0.001 to 0.5 mole percent, based on the liquid propylene. If a greater amount of hydrogen is added, the molecular weight of the polypropylene will be lowered to such an extent that the physical properties of the polymer will render it unsuitable for its normal usage in fields such as extruded tubing, sheeting, etc.

The quantity of hydrogen to be added to the reactor can be controlled by the usage of an automatic, continuous chromatograph of standard construction, readily available commercially. Such instrument can be regulated so as to have the required amount of hydrogen (0.001 to 0.5 mole percent, based on liquid propylene) in the reactor. This instrument would be used in a continuous type of polymerization process. When a batch polymerization process is used, the quantity of hydrogen can be controlled simply by usage of a pressure gauge to measure the p.s.i. of hydrogen added to the reactor.

The molar ratio of dialkyl aluminum halide to the titanium trichloride-aluminum trichloride complex used in the process of this invention should be within the general molar range of 1:1 to 10:1, the mole ratio of from 1:1 to 4:1 being preferred.

The activity of the catalyst used in this process is calculated by the conventional formula:

$$\frac{\text{grams of polymer}}{(\text{grams of catalyst})(\text{hours})}$$

The following examples are used in the illustration of this invention, but are not to be considered as limiting the scope of the invention.

POLYMERIZATION WITH TITANIUM TRICHLORIDE COMPLEX AND DIALKYL ALUMINUM HALIDE COCATALYST WITH AND WITHOUT HYDROGEN

*Example I*

1950 grams of propylene monomer was added to a standard polymerization reactor equipped with a stirrer, condenser, and thermometer. 3.05 grams of diethyl aluminum chloride cocatalyst was then added. 1.0 gram of titanium trichloride-aluminum trichloride was next added under a nitrogen atmosphere. The temperature was in-increased to 148° F. The pressure within the reactor was 360 p.s.i.g. The polymerization reaction was permitted to proceed for a period of 1.66 hours. At the end of this time, the reaction was quenched in the conventional manner with an isopropyl alcohol HCl water mixture. The polymer powder obtained was then filtered, washed, and dried in a vacuum oven at 60° C. The activity of the catalyst, using the formula set forth above, was found to be 93 grams of polymer per gram of catalyst per hour.

*Example II*

The procedure of Example I was followed, but 20 p.s.i. (0.045 mole percent) of hydrogen was first added to the reactor. 1950 grams of propylene monomer were added to the reactor. 2.54 grams of diethyl aluminum chloride cocatalyst was then introduced into the reactor. 0.52 gram of the titanium trichloride complex was next added to the reactor under the nitrogen atmosphere. The temperature of the reactor was 151° F. The pressure within the reactor was 425 p.s.i.g. The polymerization proceeded for a period of 2.0 hours. The reaction was then quenched as in the previous example, filtered, washed, and dried. The activity of the catalyst was calculated to be 246 grams of polymer per gram of catalyst per hour.

*Example III*

2500 grams of propylene monomer was added to the reactor with 0.7 gram of diethyl aluminum chloride and 0.5 gram of titanium trichloride cocrystallized with aluminum trichloride. The reactor was maintained under a nitrogen atmosphere with stirring. The temperature within the reactor was 153° F. The pressure within the reactor was 410 p.s.i.g. After a period of 2.5 hours, 175 grams of polymer had been collected. This calculated to a catalyst activity of 140 grams of polymer per gram of catalyst per hour.

*Example IV*

The system of Example III was used, but 20 p.s.i. (0.40 mole percent, based on liquid propylene) of hydrogen was added to the reactor. 1.5 grams of titanium trichloride cocrystallized with aluminum chloride and 2.1 grams of diethyl aluminum chloride were added to the reactor. The temperature was 153° F. At the end of 1.5 hours, 1186 grams of polymer had been collected. The catalyst activity was calculated to be 527 grams of polymer per gram of catalyst per hour.

*Example V*

Propylene was again polymerized in a batch manner in the diluent free process in a two gallon autoclave. 3000 grams of propylene monomer was added to the autoclave with 2.1 grams of diethyl aluminum chloride cocatalyst. 1.5 grams of the titanium trichloride complex was added to the reactor. The temperature within the reactor was 150° F. The pressure within the reactor was 400 p.s.i.g. After 0.5 hour, 190 grams of polymer had been collected. The catalyst activity was calculated to be 254 grams of polymer per gram of catalyst per hour.

*Example VI*

The system of Example V was used, but 10 p.s.i. (0.10 mole percent, based on liquid propylene) of hydrogen was also added to the reactor. After 1.5 hours, the quantity of polymer collected was dried and weighed. The catalyst activity was calculated from the above formula to be 503 grams of polymer per gram of catalyst per hour.

Example VII

The procedure of Examples I and II was followed, but the dialkyl aluminum halide was di-normal propyl aluminum chloride. 0.237 gram of the titanium trichloride: $AlCl_3$ complex was added to the reactor under a nitrogen atmosphere with stirring. The temperature of the reactor was 150° F. 200 grams of propylene monomer was next added to the reactor. 0.474 gram of di-normal propyl aluminum chloride was then added. One half atmosphere of hydrogen was added to the reactor. Polymerization was allowed to proceed for a period of 1 hour. At the end of this time, the reaction was quenched in the conventional manner with an isopropanol HCl-water mixture. The polymer powder obtained was then filtered, washed, and dried in a vacuum oven at 60° C. The activity, calculated from the above formula, was 413 grams of polymer per gram of catalyst per hour.

Example VIII

The procedure of Example VII was followed, but no hydrogen was added to the reactor. 0.261 gram of the titanium trichloride complex was added to the reactor. The temperature was 150° F. 200 grams of propylene monomer was added to the reactor. 0.523 gram of di-normal propyl aluminum chloride was also added to the reactor. The polymerization proceeded for 1 hour, at the end of which time the reaction was quenched as in the previous examples. The polymer was filtered, washed and dried in a vacuum oven at 60° C. The activity, calculated from the above formula, was 192 grams of polymer per gram of catalyst per hour.

Example IX

The procedure of Examples VII and VIII was followed, but diethyl aluminum fluoride was used as the cocatalyst. 0.264 gram of the titanium trichloride-aluminum trichloride complex was added to the reactor under a nitrogen atmosphere with stirring. The temperature of the reactor was 150° F. 200 grams of propylene monomer was added. 0.320 gram of the diethyl aluminum fluoride cocatalyst was then introduced into the reactor. One half atmosphere of hydrogen was added. After a period of 1 hour, the polymerization reaction was quenched in the conventional manner with the isopropanol HCl water mixture. The polymer obtained was then filtered, washed and dried in a vacuum oven at 60° C. The activity of the catalyst was calculated to be 592 grams of polymer per gram of catalyst per hour.

Example X

The procedure of Example IX was followed, but no hydrogen was used. 0.333 gram of the $TiCl_3$ complex was added to the reactor. The temperature within the reactor was 150° F. 200 grams of propylene monomer was then introduced into the reactor. 0.476 gram of diethyl aluminum fluoride cocatalyst was then added. After ½ hour, the reaction was quenched as in the previous examples. The polymer was then filtered, washed and dried at 60° C. The activity of the catalyst was 390 grams of polymer per gram of catalyst per hour.

POLYMERIZATION WITH $TiCl_3$ COMPLEX-DIETHYL ALUMINUM CHLORIDE COCATALYST AND SOLVENT WITH AND WITHOUT HYDROGEN

Example XI 0.539 gram of the $TiCl_3$ complex was admitted into the reactor containing 400 ml. of hexane under a nitrogen atmosphere with stirring. The temperature of the reactor was 150° F. 0.875 gram of diethyl aluminum chloride cocatalyst was then added. The pressure within the reactor was adjusted to 135 p.s.i.g. and the propylene monomer allowed to flow into the reactor on a demand basis. After 1 hour, the reaction was quenched with an isopropyl alcohol HCl water mixture. The polymer was then filtered, washed, dried in a vacuum oven at 60° C. The activity of the catalyst was calculated to be 54 grams of polymer per gram of catalyst per hour.

Example XII

The procedure of Example XI was followed, but hydrogen was used. 0.490 gram of the $TiCl_3$-$AlCl_3$ complex was added to 400 ml. of the hexane in the reactor. The temperature of the reactor was 150° F. 7 p.s.i. of hydrogen was introduced to the reactor. 0.796 gram of diethyl aluminum chloride was next added.

The pressure within the reactor was adjusted to 95 p.s.i.g. and propylene monomer allowed to flow into the reactor on a demand basis. After a period of 1 hour, the reaction was quenched as in the previous examples. The polymer was filtered, washed, dried. The activity of the catalyst was found to be 31 grams of polymer per gram of catalyst per hour.

The result of the foregoing examples are summarized in the following table.

TABLE

| Example No. | TiCl₃:AlCl₃ gms. | Dialkyl Al Halide, gms. | Propylene, gms. | Temp., °F. | H₂, p.s.i. | Solvent, ml. | Catalyst Activity gms. polymer/ (gms. catalyst)(hrs) |
|---|---|---|---|---|---|---|---|
| 1 | 1.0 | ¹ 3.05 | 1,950 | 148 | 0 | | 93 |
| 2 | 0.52 | ¹ 2.54 | 1,950 | 151 | 20 | | 246 |
| 3 | 0.5 | ¹ 0.7 | 2,500 | 153 | 0 | | 140 |
| 4 | 1.5 | ¹ 2.1 | 1,186 | 153 | 20 | | 527 |
| 5 | 1.5 | ¹ 2.1 | 3,000 | 150 | 0 | | 254 |
| 6 | 1.5 | ¹ 2.1 | 3,000 | 150 | 10 | | 503 |
| 7 | 0.237 | ² 0.474 | 200 | 150 | 7.35 | | 413 |
| 8 | 0.261 | ² 0.523 | 200 | 150 | 0 | | 192 |
| 9 | 0.264 | ³ 0.320 | 200 | 150 | 7.35 | | 592 |
| 10 | 0.333 | ³ 0.476 | 200 | 150 | 0 | | 390 |
| 11 | 0.539 | ¹ 0.875 | (⁴) | 150 | 0 | ⁵ 400 | 54 |
| 12 | 0.490 | ¹ 0.796 | (⁴) | 150 | 7 | ⁵ 400 | 31 |

¹ Diethyl aluminum chloride.
² Di-normal propyl aluminum chloride.
³ Diethyl aluminum fluoride.
⁴ Propylene flowed into the reactor on a demand basis.
⁵ Hexane.

An analysis of the experimental results (Examples XI and XII) indicates that the addition of hydrogen to a propylene polymerization process utilizing a solvent decreases the activity of the catalyst. However, Examples I through X conclusively demonstrate that the addition of hydrogen to the polymerization of propylene in a diluent free process drastically increases the catalyst activity. From these results, it can be seen that the catalyst activity is generally increased by a factor of at least two times. When the results of this process are compared with those of the propylene polymerization process utilizing a solvent and hydrogen, and the prior art process of polymerizing propylene in the diluent free process utilizing hydrogen and an organometallic catalyst component other than a dialkyl aluminum halide, wherein in catalyst activity is significantly decreased, the results are very unexpected and surprising.

The polypropylene produced by the process of this invention is suitable for many uses including the molding of relatively stiff articles by injection, compression, or extrusion molding. It has particular application in such fields as extruded tubing, molded articles of all kinds, fibers and yarns, and films and sheetings, coatings and laminates.

It is to be understood that many equivalent modifications will be apparent to those skilled in the art from the reading of the foregoing disclosure without a departure from the intended concept of the invention.

What is claimed is:

1. In a process for the polymerization of propylene in a diluent free system wherein propylene is polymerized in liquid propylene in the presence of a polymerization catalyst, the improvement which comprises polymerizing said liquid propylene in the presence of a catalytic amount of a titanium trichloride-aluminum trichloride complex and dialkyl aluminum halide cocatalyst system at a pressure of about 130 to 650 p.s.i.g. and at a temperature of about 20 to 170° C. and from 0.001 to 0.5 mole percent of hydrogen based on liquid propylene, to increase the rate of polymerization.

2. The process of claim 1 wherein the dialkyl aluminum halide is diethyl aluminum chloride.

3. The process of claim 1 wherein the dialkyl aluminum halide is di-normal propyl aluminum chloride.

4. The process of claim 1 wherein the dialkyl aluminum halide is diethylaluminum fluoride.

5. In a process for the polymerization of propylene in a diluent free system wherein propylene is polymerized in liquid propylene in the presence of a polymerization catalyst, the improvement which comprises polymerizing said liquid propylene in the presence of a catalytic amount of a $TiCl_3:AlCl_3$ complex having a mole ratio of about $3TiCl_3:1AlCl_3$ and a diethylaluminum monochloride cocatalyst at a pressure of about 130 to 650 p.s.i.g. and a temperature of about 60° to 90° C. and from 0.001 to 0.5 mole percent of hydrogen based on liquid propylene to increase the rate of polymerization.

References Cited

UNITED STATES PATENTS

| | | | |
|---|---|---|---|
| 3,193,360 | 7/1965 | Scoggin | 260—93.7 |
| 3,002,961 | 10/1961 | Kirschner et al. | 260—94.9 |
| 3,040,014 | 6/1962 | Lovett et al. | 260—94.9 |
| 3,147,241 | 9/1964 | Moberly | 260—94.9 |

JOSEPH L. SCHOFER, *Primary Examiner.*

M. B. KURTZMAN, *Assistant Examiner.*